(12) United States Patent
Levinson et al.

(10) Patent No.: US 7,363,719 B2
(45) Date of Patent: Apr. 29, 2008

(54) POCKET LEVEL

(75) Inventors: Amy Levinson, MP Upper Galilee (IL); Gabriel Kohner, Upper Galilee (IL)

(73) Assignee: Kapro Industries, Ltd, Kibbutz Kadarim, M P Bikat Beit Hakarem (IL)

( * ) Notice: Subject to any disclaimer, the term of this patent is extended or adjusted under 35 U.S.C. 154(b) by 0 days.

(21) Appl. No.: 10/585,112

(22) PCT Filed: Dec. 31, 2003

(86) PCT No.: PCT/IL03/01123

§ 371 (c)(1), (2), (4) Date: Jun. 30, 2006

(87) PCT Pub. No.: WO2005/064272

PCT Pub. Date: Jul. 14, 2005

(65) Prior Publication Data

US 2007/0113414 A1    May 24, 2007

(51) Int. Cl.
*G01C 9/26* (2006.01)
*G01C 9/28* (2006.01)

(52) U.S. Cl. .......................... 33/384; 33/381; 33/347; 33/354; 33/369; 33/374; 33/451; 33/390

(58) Field of Classification Search .......... 33/379–390, 33/347, 351, 353, 354, 368–371, 451, 365, 33/374, 375, 376, 377
See application file for complete search history.

(56) References Cited

U.S. PATENT DOCUMENTS

| 359,580 | A |   | 3/1887 | Thatcher | 33/388 |
|---|---|---|---|---|---|
| 767,188 | A | * | 8/1904 | Warner | 33/369 |
| 785,581 | A | * | 3/1905 | Shorts | 33/381 |
| 935,807 | A |   | 10/1909 | Oswald | 33/383 |
| 964,066 | A | * | 7/1910 | Sprenkle | 33/398 |
| 1,126,548 | A |   | 1/1915 | Mayes | 33/388 |
| 1,215,035 | A | * | 2/1917 | Kocisko | 33/387 |
| 1,802,131 | A |   | 4/1931 | Wright | 33/388 |
| 2,439,698 | A | * | 4/1948 | Shaler | 33/387 |
| 2,506,115 | A |   | 5/1950 | Stahlin | 33/388 |
| 2,515,680 | A | * | 7/1950 | Walden | 33/388 |
| 2,541,880 | A |   | 2/1951 | Mc Millan et al. | 33/388 |
| 2,692,440 | A | * | 10/1954 | Walters | 33/383 |
| 3,878,617 | A |   | 4/1975 | West et al. | 33/369 |
| 4,068,386 | A |   | 1/1978 | Streeter | 33/369 |

(Continued)

FOREIGN PATENT DOCUMENTS

AU    13950/83    11/1983

(Continued)

*Primary Examiner*—G. Bradley Bennett
*Assistant Examiner*—Amy Cohen Johnson
(74) *Attorney, Agent, or Firm*—Harold L. Novick; The Nath Law Group

(57) ABSTRACT

A pocket level having a detachable line level whose bubble vial doubles as the pocket level's horizontal bubble vial, and an angle finder for enabling the determination of the angle of an inclined surface which includes a bubble vial housed in a wheel rim directly rotated by a user applying a rotation force to a portion of its exterior non-slip circumferential wheel rim surface preferably accessible via a throughgoing cutout formed in the pocket level's upper surface.

16 Claims, 5 Drawing Sheets

U.S. PATENT DOCUMENTS

| | | | |
|---|---|---|---|
| 4,109,392 A | 8/1978 | Streeter | 33/381 |
| 4,320,581 A * | 3/1982 | Ousterhout | 33/388 |
| 4,419,833 A * | 12/1983 | Wright | 33/379 |
| 4,481,720 A * | 11/1984 | Sury | 33/451 |
| 4,774,767 A * | 10/1988 | Scheyer | 33/388 |
| 5,103,569 A | 4/1992 | Leatherwood | 33/379 |
| 5,177,873 A | 1/1993 | Tate | 33/385 |
| 5,531,031 A | 7/1996 | Green | 33/365 |
| 6,477,781 B1 | 11/2002 | Blatt | 33/384 |
| 6,640,456 B2 * | 11/2003 | Owoc et al. | 33/382 |
| D498,686 S * | 11/2004 | Levinson et al. | D10/69 |
| 6,829,836 B1 * | 12/2004 | Black | 33/369 |
| 7,152,335 B2 * | 12/2006 | Nichols | 33/390 |
| 2007/0113414 A1 * | 5/2007 | Levinson et al. | 33/451 |
| 2007/0271802 A1 * | 11/2007 | Tran et al. | 33/365 |

FOREIGN PATENT DOCUMENTS

| | | |
|---|---|---|
| DE | 32 05 206 | 8/1983 |
| DE | 3413449 | 2/1985 |
| GB | 2210167 | 6/1989 |
| GB | 2 348 953 | 10/2000 |

* cited by examiner

POCKET LEVEL

CROSS-REFERENCE TO RELATED APPLICATIONS

This application is the national phase filing of PCT international application Serial No. PCT/IL2003/001123 filed on 31 Dec. 2003.

FIELD OF THE INVENTION

The invention is in the field of spirit levels in general and pocket levels in particular.

BACKGROUND OF THE INVENTION

Spirit levels and line levels are employed for different leveling purposes and are accordingly typically packaged and sold as discrete items. Exemplary line levels are illustrated and described in U.S. Pat. No. 3,878,617, U.S. Pat. No. 4,068,386, and U.S. Pat. No. 4,109,392. GB 2210167 illustrates and describes a pocket level having a horizontal bubble vial and a vertical bubble vial, and a detachable line level.

Spirit levels may be provided with angle finders for enabling the determination of the angle of an inclined surface. Exemplary spirit levels with angle finders are illustrated and described in U.S. Pat. No. 359,580, U.S. Pat. No. 935,807, U.S. Pat. No. 1,126,548, U.S. Pat. No. 1,802,131, U.S. Pat. No. 2,506,115, U.S. Pat. No. 2,541,880, U.S. Pat. No. 5,177,873, U.S. Pat. No. 5,531,031, U.S. Pat. No. 6,477,781, AU-A-13950/83, and DE 3413449 A1.

SUMMARY OF THE INVENTION

The present invention is for a pocket level having a detachable line level whose horizontal bubble vial doubles as the pocket level's horizontal bubble vial such that a user is afforded the benefit of two leveling devices sharing the same bubble vial to reduce costs, and conveniently packaged as a single item. The present invention is also for a pocket level with an angle finder for enabling the determination of the angle of an inclined surface which includes a wheel rim having a bubble vial which is directly rotated by a user applying a rotation force to a portion of its exterior non-slip circumferential wheel rim surface accessible via a throughgoing cutout formed in the pocket level's upper surface or end surface.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DESCRIPTION OF PREFERRED EMBODIMENTS OF THE INVENTION

Figure 1:
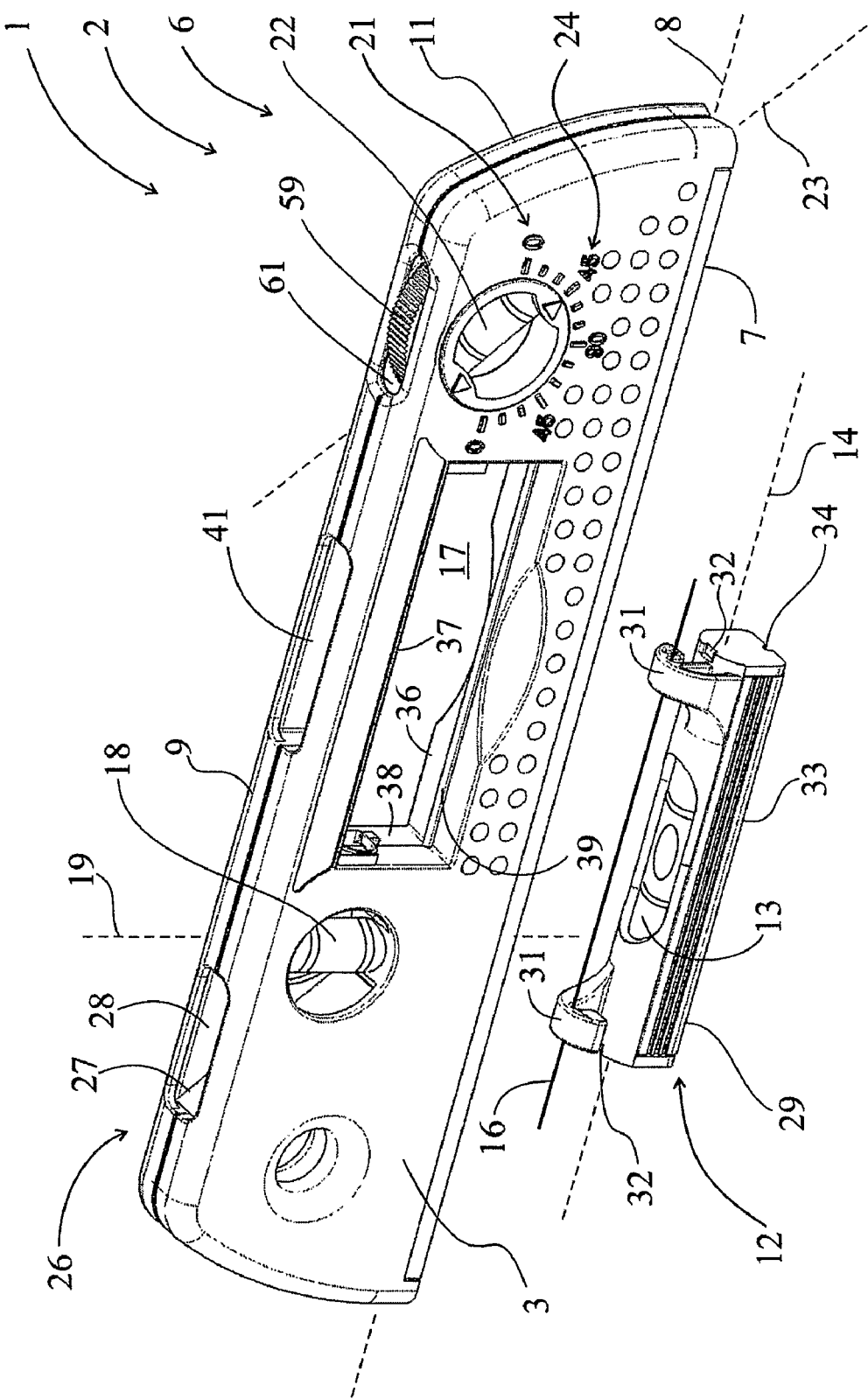
FIG. 1 is a perspective view showing a first preferred embodiment of a pocket level with a detachable line level dissembled therefrom.
Figure 2:
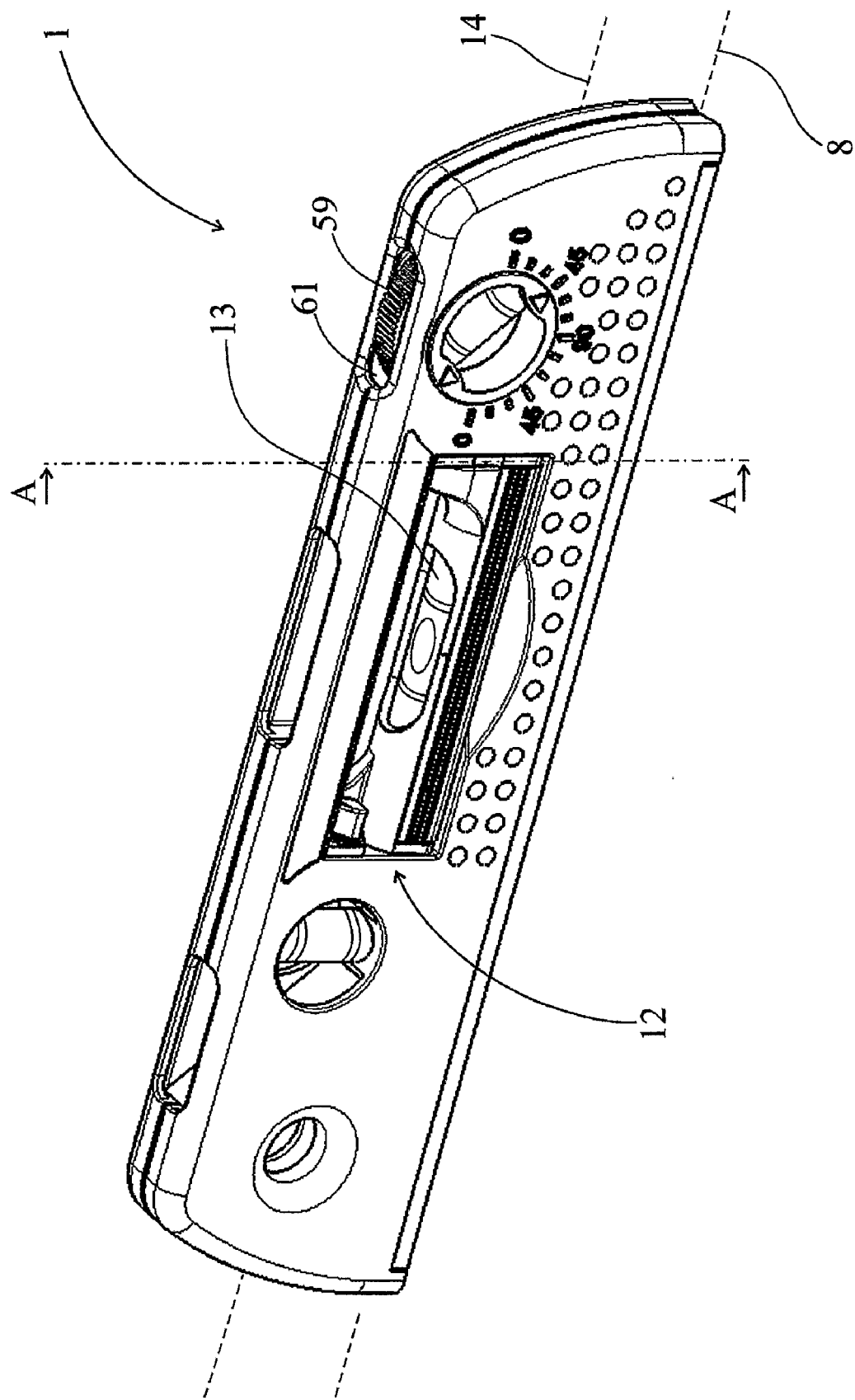
FIG. 2 is a perspective view showing of the pocket level of FIG. 1 with its detachable line level assembled therein.

FIG. 1 shows a pocket level 1 having a generally prismatoidal body 2 with a front surface 3, a rear surface 4 (not shown), and a generally trapezoidal surround 6 constituting a generally quadrilateral surround. The surround 6 includes a leveling surface 7 for placing on a surface and defining a longitudinal axis 8, an upper surface 9 opposite the leveling surface 7, and a pair of end surfaces 11. The pocket level 1 includes a detachable line level 12 having a horizontal bubble vial 13 with a longitudinal axis 14 for indicating the inclination of a horizontally disposed line 16 with respect to the horizontal for assembly in a centrally disposed substantially rectangular throughgoing recess 17 as shown in FIG. 2 such that the bubble vial's longitudinal axis 14 is parallel to the longitudinal axis 8 whereby the horizontal bubble vial 13 doubles as the pocket level's horizontal bubble vial for indicating the inclination of a surface with respect to the horizontal.

The pocket level 1 also includes a vertical bubble vial 18 with a longitudinal axis 19 perpendicular to the longitudinal axis 8 for indicating the inclination of a surface with respect to the vertical, and an angle finder 21 with a rotatable bubble vial 22 with a longitudinal axis 23 for enabling the determination of the angle of an inclined surface using the angle markings 24. The pocket level 1 can be provided with Applicant's so-called Plumbsite® front viewing feature 26 as disclosed in PCT/IL97/00359, and including a mirror 27 inclined at 45° to the longitudinal axis 8, and a throughgoing cutout 28 in the upper surface 9.

Figure 4:
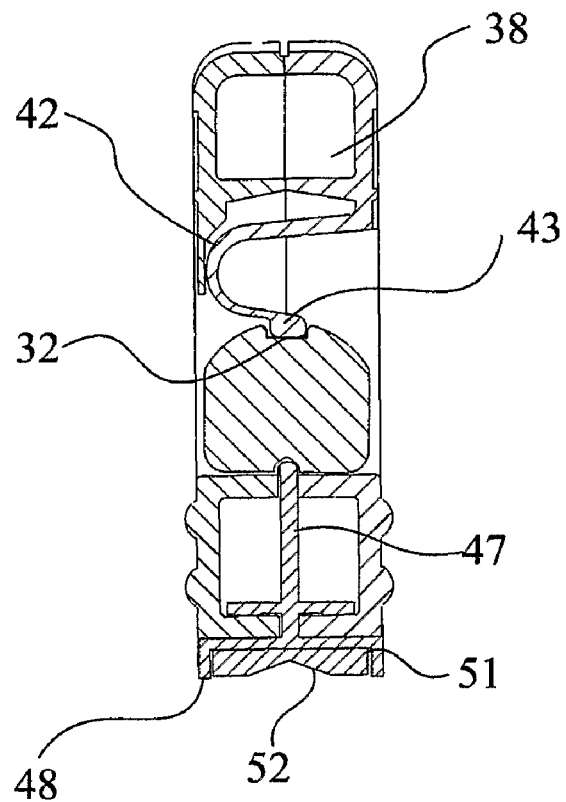
FIG. 4 is a cross section view in the direction of the line A-A in FIG. 2.

The line level 12 includes a housing 29 with pair of oppositely directed hooked members 31 at its opposite ends for hooking onto the line 16, a pair of upward facing cutouts 32 at its opposite ends, and an underneath surface 33 with a longitudinal groove 34. The recess 17 has a bottom wall 36, a top wall 37 and side walls 38. The bottom wall 36 is provided with a longitudinally extending rib 39 parallel to the longitudinal axis 8 for snug insertion into the groove 34 on assembly of the line level 12 into the body 2 for facilitating its correct placement. The top wall 37 is formed with a throughgoing cutout 41 for enabling a user to view the horizontal bubble vial 13 on assembly of the line level 12 into the body 2. FIG. 4 shows that each side wall 38 is provided with a U-shaped retaining member 42 having a resiliently flexible free end 43 for snap fitting into a retaining cutout 32 on assembly of the line level 12 into the body 2.

Figure 3:
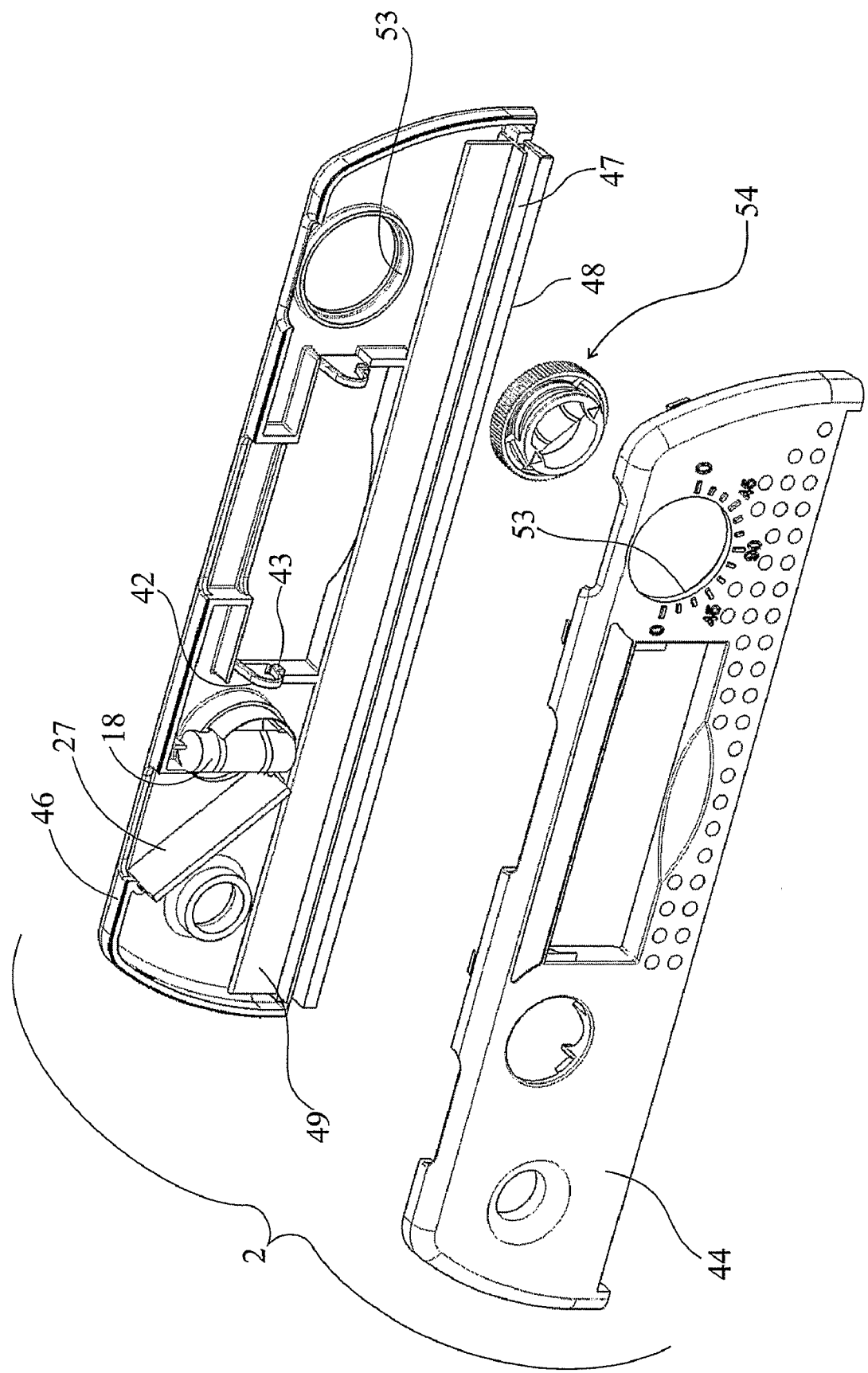
FIG. 3 is an exploded view of the body of the pocket level of FIG. 1.

FIG. 3 shows that the body 2 is formed from two substantially identical housing halves 44 and 46 made of thermoplastic material, and having the vertical bubble vial 18 and its associated mirror 27, and an inverted generally T-cross sectioned strut 47 sandwiched therebetween. The strut 47 has a horizontal member 48 and an upwardly extending elongated member 49 whose upper portion above the bottom wall 36 constitutes the longitudinally extending rib 39. The horizontal member 48 can be formed with a channel 51 therealong for receiving a magnetic strip 52 (see FIG. 4) constituting a leveling surface 7 whereby the pocket level 1 is magnetically attachable to ferrous objects. The two halves 44 and 46 are formed with a pair of opposite and spaced apart raceways 53 for rotatably supporting opposite sides of a wheel rim 54.

Figure 5:
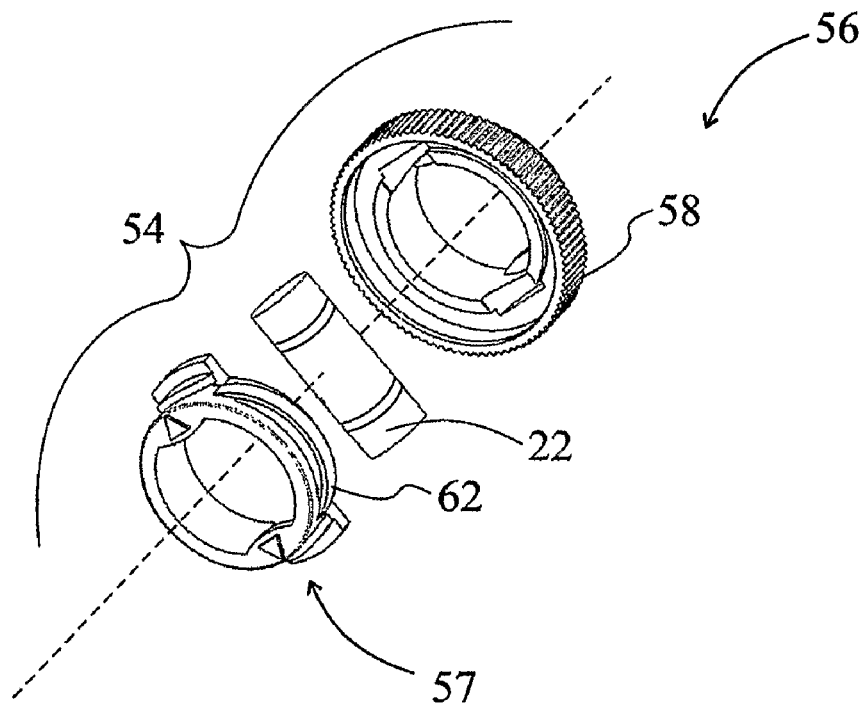
FIG. 5 is an exploded view of the wheel rim of the angle finder of the pocket level of FIG. 1.

FIG. 5 shows that the wheel rim 54 is formed from two wheel rim halves 56 and 57 with the rotatable bubble vial 22 diametrically extending thereacross. The wheel rim half 56 is formed with an external ribbed circumferential wheel rim surface 58 (constituting a non-slip surface) having a minor arc portion 59 accessible via a throughgoing cutout 61 formed in the upper surface 9 for enabling user direct rotation of the wheel rim 54 and therefore the bubble vial 22

(see FIGS. 1 and 2). The opposite wheel rim half 57 includes a pair of diametrically disposed resiliently flexible members 62 urged against their associated raceway 53 for frictionally impeding direct user rotation of the wheel rim 54.

Figure 6:
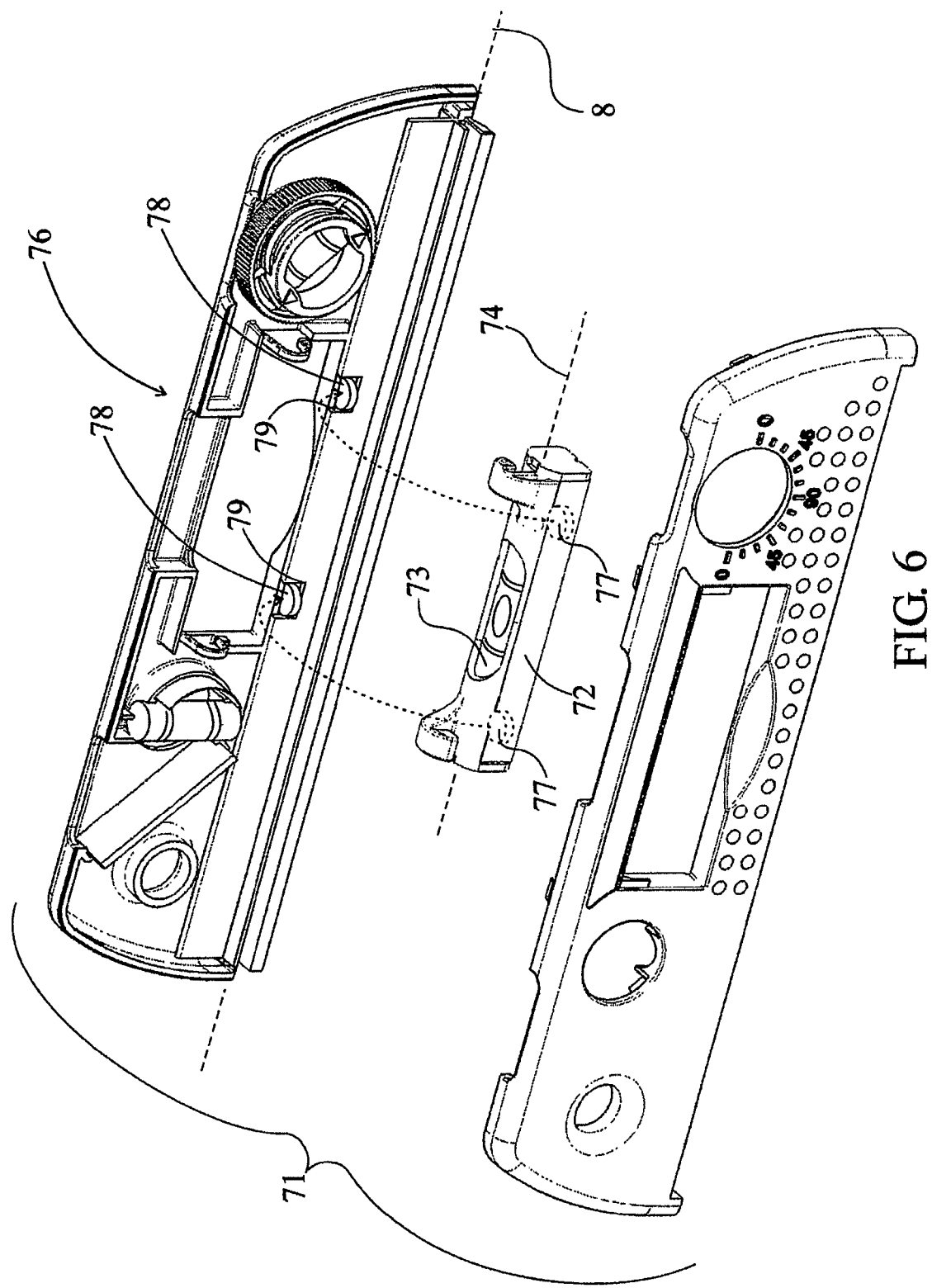
FIG. 6 is a perspective view showing a second preferred embodiment of a pocket level with a detachable line level dissembled therefrom.

FIG. 6 shows a pocket level 71 similar in construction and operation to the pocket level 1 insofar that it includes a detachable line level 72 whose horizontal bubble vial 73 having a longitudinal axis 74 doubles as the pocket level's horizontal bubble vial. The pocket level 71 differs from the pocket level 1 in that the detachable line level 72 is assembled therein by virtue of a magnetic arrangement 76. The magnet arrangement 76 includes a pair of powerful ceramic disc magnets 77 at opposite ends of the line level 72 and a pair of powerful ceramic disc magnets 78 inserted into cutouts 79 formed in the elongated member 49 to underlie the disc magnets 77 on assembly of the line level 72 into the pocket level 71.

While the invention has been described with respect to a limited number of embodiments, it will be appreciated that many variations, modifications, and other applications of the invention can be made within the scope of the appended claims. For example, the leveling surface 7 may have a longitudinal groove for placing on a pipe, and the like. The line levels 12 and 72 can be formed with a longitudinally extending slot similar to GB 2210167's longitudinally extending slot 24. The wheel rim surface can be knurled and the like to effect non-slipping.

The invention claimed is:

1. A pocket level having a horizontal bubble vial for indicating the inclination of a horizontally disposed surface with respect to the horizontal, the pocket level comprising
a generally prismatoidal body with front and rear surfaces, and a generally quadrilateral surround including a leveling surface for placing on the horizontally disposed surface and an upper surface opposite said leveling surface,
said body rotatably supporting an angle finder having a wheel rim with a bubble vial diametrically extending thereacross and having an external non-slip circumferential wheel rim surface, and
said quadrilateral surround having a throughgoing cutout with a length such as to limit access to a minor arc portion of said wheel rim surface thereby enabling user direct rotation of said wheel rim while said leveling surface is placed on an inclined surface for enabling determination of the angle of the inclined surface.

2. The level according to claim 1 wherein said upper surface is formed with said throughgoing cutout having a generally elongated shape in plan view with a width and length such that only a minor arc portion of said wheel rim surface can extend therethrough for enabling access to only a minor arc portion of said wheel rim surface thereby enabling user direct rotation of said wheel rim.

3. The level according to claim 2 wherein said body has a recess for assembly of a detachable line level having a horizontal bubble vial for indicating the inclination of a horizontally disposed line with respect to the horizontal therein such that said line level's horizontal bubble vial doubles as the pocket level's horizontal bubble vial.

4. The level according to claim 2 wherein said body includes a pair of opposite and spaced apart raceways for rotatably supporting said wheel rim, and said wheel rim includes at least one resiliently flexible member urged against one of said pair of raceways for frictionally impeding direct user rotation of said rotatable bubble vial.

5. The level according to claim 1 wherein said body includes a pair of opposite and spaced apart raceways for rotatably supporting said wheel rim, and said wheel rim includes at least one resiliently flexible member urged against one of said pair of raceways for frictionally impeding direct user rotation of said rotatable bubble vial.

6. The level according to claim 5 wherein said body has a recess for assembly of a detachable line level having a horizontal bubble vial for indicating the inclination of a horizontally disposed line with respect to the horizontal therein such that said line level's horizontal bubble vial doubles as the pocket level's horizontal bubble vial.

7. The level according to claim 1 wherein said body has a recess for assembly of a detachable line level having a horizontal bubble vial for indicating the inclination of a horizontally disposed line with respect to the horizontal therein such that said line level's horizontal bubble vial doubles as the pocket level's horizontal bubble vial.

8. The level according to claim 7 wherein said body includes a substantially centrally disposed throughgoing recess for assembly of said line level therein.

9. The level according to claim 7 wherein said line level has a bottom surface formed with a groove extending longitudinally therealong and said recess has a longitudinally extending rib for snug insertion into said groove on assembly of said line level therein.

10. The level according to claim 9 wherein said body includes an inverted generally T-cross sectioned strut with an upwardly extending elongated member whose upper portion constitutes said longitudinally extending rib.

11. The level according to claim 7 wherein said upper surface has a throughgoing cutout for enabling said line level's horizontal bubble vial to be viewed therefrom when said line level is assembled therein.

12. The level according to claim 7 wherein said line level has a housing with a pair of upward facing cutouts at opposite ends and said recess has a pair of side walls each having a U-shaped retaining member with a resiliently flexible free end for snap fitting into a cutout when said line level is assembled in said recess.

13. The level according to claim 7 wherein a magnet arrangement retains said line level in said recess.

14. The level according to claim 1 and further including a detachable line level with a level vial therein and has a bottom surface formed with a groove extending longitudinally therealong and wherein said body has a recess for assembly with said detachable line level, said recess having a longitudinally extending rib for snug insertion into said groove on assembly of said line level therein; and
wherein said body includes an inverted generally T-cross sectioned strut with an upwardly extending elongated member whose upper portion constitutes said longitudinally extending rib.

15. The level according to claim 14 wherein said line level has a housing with a pair of upward facing cutouts at opposite ends and said recess has a pair of side walls each having a U-shaped retaining member with a resiliently flexible free end for snap fitting into a cutout when said line level is assembled in said recess.

16. The level according to claim 1 wherein said pocket level body is comprised of a thermoplastic material.

* * * * *